United States Patent [19]
Wright

[11] 3,879,166
[45] Apr. 22, 1975

[54] APPARATUS FOR HEATING MOLDING MATERIALS

[75] Inventor: Charles R. Wright, Connersville, Ind.

[73] Assignee: Philco-Ford Corporation, Blue Bell, Pa.

[22] Filed: Apr. 19, 1974

[21] Appl. No.: 462,354

Related U.S. Application Data

[62] Division of Ser. No. 361,344, May 17, 1973, Pat. No. 3,838,962.

[52] U.S. Cl. ................. 432/176; 219/369; 432/223
[51] Int. Cl. ............................................. F27b 17/00
[58] Field of Search ............. 432/223, 176; 219/369

[56] References Cited
UNITED STATES PATENTS

| | | | |
|---|---|---|---|
| 2,619,341 | 11/1952 | Wallerius | 432/176 X |
| 2,952,452 | 9/1960 | Kopf | 432/176 X |

FOREIGN PATENTS OR APPLICATIONS

| | | | |
|---|---|---|---|
| 1,008,343 | 5/1957 | Germany | 219/369 |

*Primary Examiner*—John J. Camby
*Attorney, Agent, or Firm*—Robert D. Sanborn; Harry W. Hargis, III

[57] ABSTRACT

Molding apparatus operating on the fluid pressure forming principle comprises a pressurizable chamber having elevatable vacuum mold structure therein, including a pair of closely spaced unidirectionally presented molds. A clamping ring is positionable to hold a sheet of thermoplastic material over the rim of the chamber, in air-tight relation. Means is provided for heating the sheet until it sags slightly, and for introducing heated air under pressure to the chamber to billow the heat-softened sheet upwardly in an amount sufficient to achieve an initial stretch, followed by engagement of the billowed sheet by an assist-plug to urge portions thereof toward the region of adjacency of the unidirectionally presented molds, thereby forming a pair of billowed sections of lesser size. The vacuum molds are elevated into the billowed sheet portions of lesser size, and a vacuum is drawn to the opposite side of the molds to conform the softened sheet to the latter. Heated pressurized air for billowing is supplied by a combination heater-blower device having a valving system capable of operation either to supply heated air to the chamber, or to halt the supply of air and recirculate same over the heater in anticipation of a billowing operation for an ensuing molding cycle.

6 Claims, 7 Drawing Figures

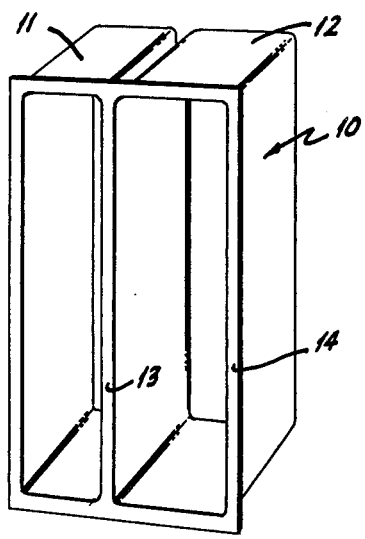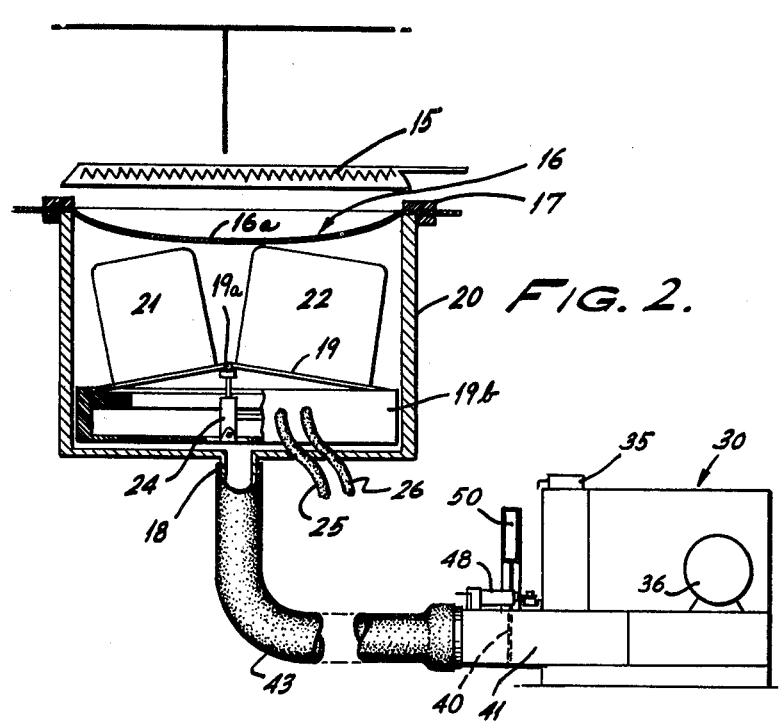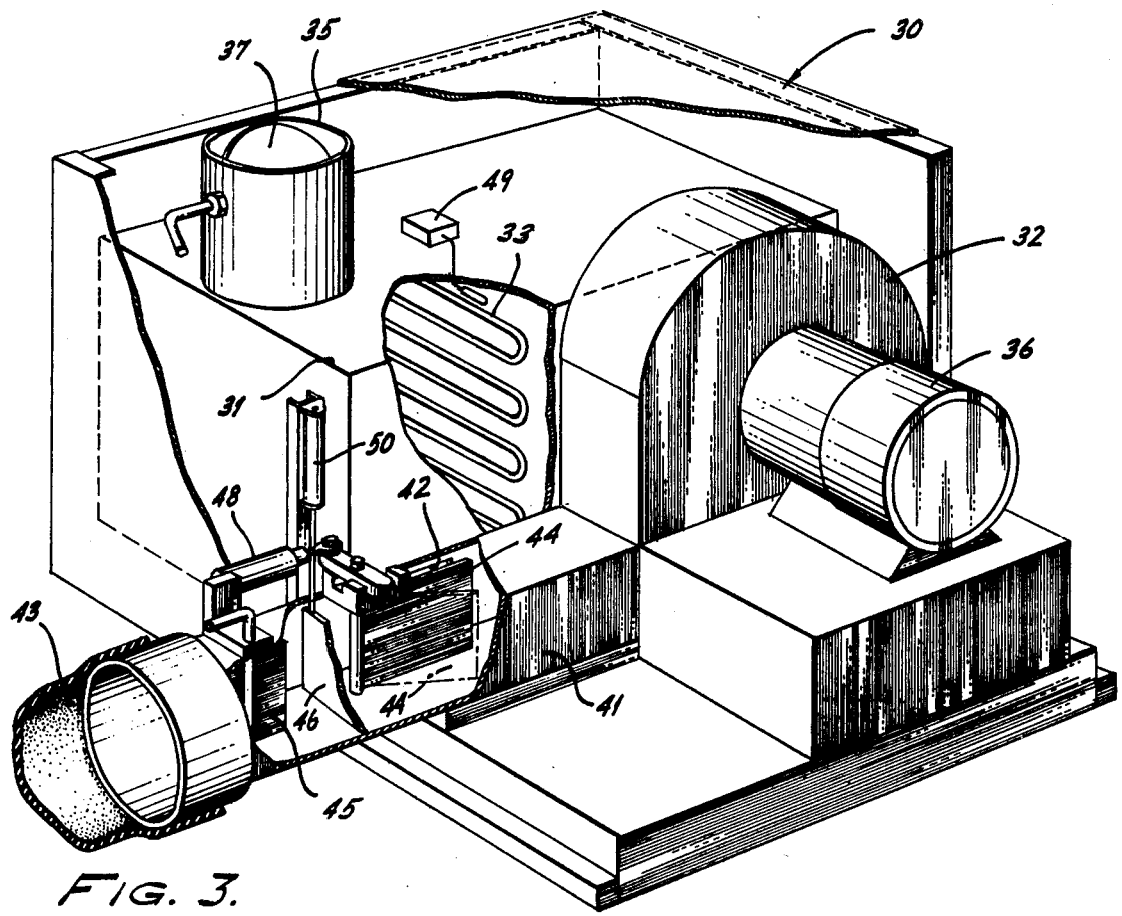

APPARATUS FOR HEATING MOLDING MATERIALS

CROSS REFERENCE TO RELATED DISCLOSURES

This invention is directed to improvements in apparatus of the type disclosed and claimed in U.S. Pat. No. 3,724,989, issued Apr. 3, 1973, to Norman F. Houghton, and assigned to the assignee of the present invention.

This is a division of application Ser. No. 361,344, filed May 17, 1973, now U.S. Pat. No. 3,838,962.

BACKGROUND OF THE INVENTION

This invention relates to molding apparatus, and is especially concerned with improvements in fluid-pressure molding apparatus for forming sheets of thermoplastic material into relatively deep-drawn shapes.

In the fluid-pressure molding of integral, dual-compartment refrigerator liners utilizing vacuum-forming techniques, problems have been encountered in achieving and maintaining an optimum combination of temperature of a heat-softened thermoplastic sheet and the pressure exerted thereon, to realize such proportions of the billowed sheet to the mold sections as are conducive to formation of an article of substantially uniform wall thickness. The temperature of a billowed sheet is a function of both the initial temperature of the sagged heat-softened sheet and the temperature of the subsequently introduced pressurized, billowing air. Use of expanded compressed air for billowing has not proven satisfactory in the achievement of uniform wall thickness, due to the cooling effect of the expanding air. Moreover, heating of such air has afforded imprecise, inefficient temperature control of the heat-softened sheet.

It is a general objective of this invention to provide improved billowing apparatus that enhances control of thermoplastic sheet thickness in a vacuum forming operation.

It is a further and more specific objective to provide novel apparatus for supplying temperature-controlled, heated, pressurized air for use in a vacuum-forming operation.

SUMMARY OF THE INVENTION

In achievement of the foregoing as well as other objectives and advantages, the invention proposes improvements in fluid pressure molding apparatus of the type including means defining a pressurizable chamber having a planar rim portion, means for holding a sheet of thermoplastic material over said rim portion in airtight engagement therewith, means for heating such a sheet of material to a softened state, mold means in said chamber, means for exerting fluid pressure on a softened sheet to urge it onto said mold means, and means for causing said softened sheet to billow upwardly prior to exertion of fluid pressure on the sheet to urge it into conformity with said mold means. Improvement resides in the means for billowing, which is particularly characterized by the inclusion of blower means operable to draw air over heater means, and valve means operable either to effect the flow of one portion of the air to the chamber, to billow the heat-softened sheet, and another portion of the heated air over the heater for return to the blower, or to halt the flow of heated air to the chamber and to divert full flow of said air over said heater for return to the inlet of said blower, in provision of an immediate supply of heated pressurized air for a subsequent molding cycle.

The manner in which the objectives and advantages of the invention may best be achieved will be more fully understood from the following description, taken in light of the accompanying drawing.

BRIEF DESCRIPTION OF THE DRAWING

FIG. 1 is a perspective showing of a unitary, two-compartment refrigerator cabinet liner illustrative of an article of thermoplastic material formed by apparatus embodying the invention;

FIG. 2 is a somewhat diagrammatic operational showing, partly in section, of vacuum forming apparatus including a combined heater and blower to which the invention is especially directed;

FIG. 3 is a detailed perspective showing of the combined heater and blower seen in FIG. 2, and with portions fragmented for convenience of illustration.

DESCRIPTION OF THE PREFERRED EMBODIMENT

Figure 4:
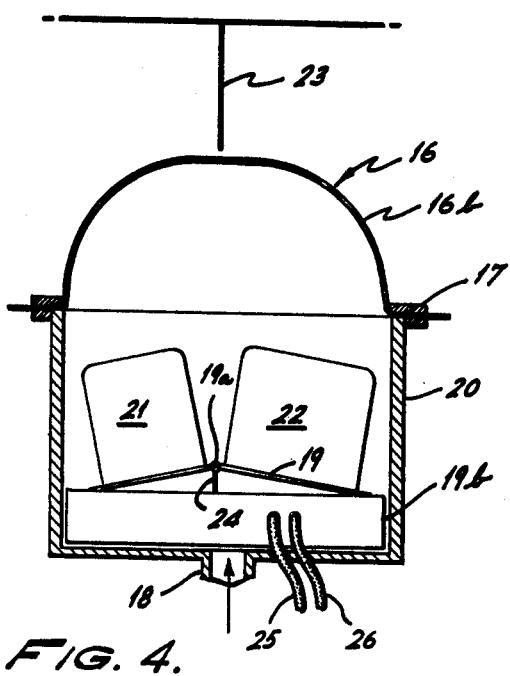
FIGS. 4 to 7 are sequential, diagrammatic showings of the operation of apparatus shown in FIGS. 2 and 3.

With more detailed reference to FIG. 1, a refrigerator cabinet liner 10, formed using apparatus embodying the invention, comprises a pair of integrally molded, deep-drawn sections 11 and 12 interconnected by a web portion 13 and surrounded by a frontally facing flange 14 coplanar with web portion 13.

The referenced U.S. Pat. No. 3,724,989 discloses molding apparatus useful in the forming of a liner of the aforementioned type. In operation of that apparatus, the heat-softened sheet is billowed away from the molds, in order initially to stretch the sheet, prior to engagement of the sheet by the molds. The present invention is directed to improved apparatus for insuring precise volume and temperature control of the air used for billowing, whereby to achieve uniform stretching of the billowed sheet. The importance of such control will be more fully appreciated when it is considered that in formation of a dual-compartment refrigerator liner of typical size, a 4 by 6 foot sheet of ABS thermoplastic material (a known resinous material derived from acrylonitrile, butadiene, and styrene) about 0.290 inch thick, and weighing about 40 pounds, is drawn to form a pair of unidirectionally presented compartments about 23 inches deep, 11 to 17 inches in width, and about 53 inches in height, with a space of about 1½ inches between confronting wall surfaces of the compartments. Typically, in such a molding operation, there may occur as much as a 10-to-1 reduction in the 0.290 inch material thickness, for example in the regions of some rear corners.

Turning again to the drawing, and with reference to FIG. 2, apparatus embodying the invention includes a radiant heater 15 positioned over a sheet of thermoplastic material 16, such as that described above, that has been clamped by frame means 17 in fluid-tight relation over a fluid-tight chamber 20. Heater 15 is energizable to raise the temperature of sheet 16 sufficiently to cause it to become softened and to stretch by sagging, as shown, while molds 21 and 22 are held in spread position by upward pivotation of mold support structure 19 about hinge 19a, on a box-shaped portion 19b. Molds 21 and 22 are held in this position by a pneumatic-cylinder linkage 24 on support structure 19, and supplied by a flexible hose 25 connected to a suitable source of pressure. The central portion 16a of sagged sheet 16 is opposite the relatively wide space between the upper confronting edges of pivoted molds 21 and 22, to make available an abundance of thermoplastic sheet material to accommodate the relatively deep draw to form the confronting liner wall sections.

Turning now to FIG. 4, and prior to a detailed consideration of FIG. 3, heater 15 has been removed, and slight air pressure has been applied to chamber 20, through duct connection 18, causing the plastic sheet to stretch further and assume the upwardly billowed position as seen at 16b. It is the apparatus for supplying heated pressurized air for this purpose to which this invention is especially directed, and which apparatus will be described in detail in connection with FIG. 3, following further description of operation of the apparatus to which it has special applicability.

Figure 5:
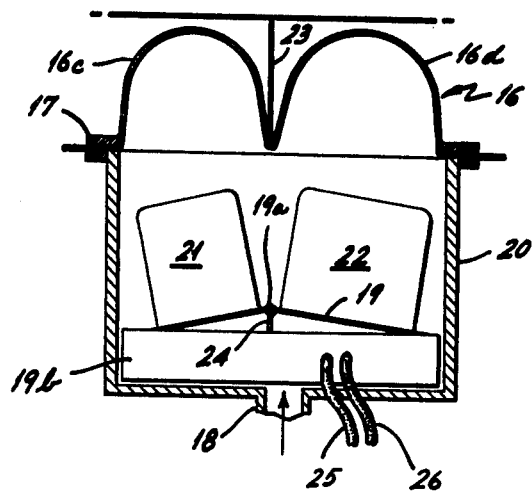

Considering further operational aspects of the forming apparatus, and with reference to FIG. 5, a vertically movable assist-plug 23 is moved downwardly a sufficient distance to engage a generally central portion of the upwardly billowed sheet 16b and to effect billowed extension thereof, as seen at 16c and 16d, to either side of the assist-plug.

Figure 6:
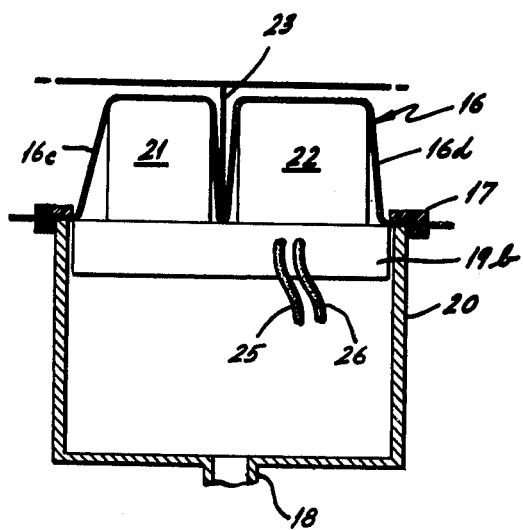

Molds 21 and 22 are then moved upwardly, into the non-pivoted position shown in FIG. 6, with the result that the plastic sheet is drawn over the molds, as they are moved from pivoted position to the position shown through actuation of cylinder linkage 24. Having molds 21 and 22 in spread, pivoted position, during such relative movements, insures full draw while maintaining adequate thickness of the spaced adjacent liner sidewalls as the molds are moved to closely spaced position, through advantageous presence of excess material made available in the mid-region 16a for drawing by assist plug 23.

Figure 7:
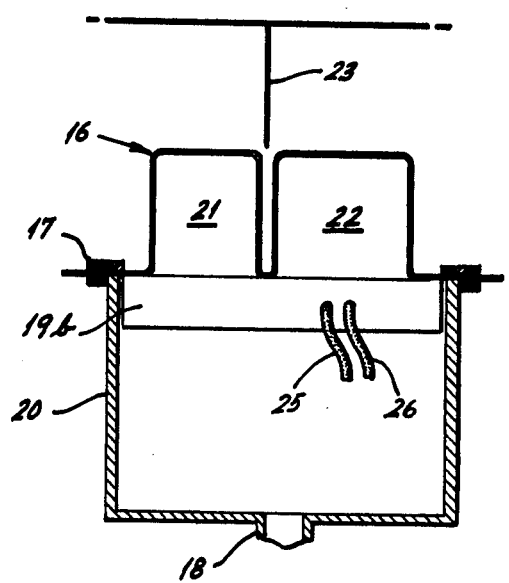

With reference to FIG. 7, sufficient vacuum is drawn through flexible hose 26 connected to a suitable vacuum source, to evacuate air, by way of the box-shaped support portion 19b, from between molds 21 and 22 and the thermoplastic sheet, thereby causing the sheet to conform closely to the shapes of the molds.

The vacuum is then released, formed sheet 16 is cooled, assist-plug 23 is withdrawn, and the clamping frame 17 is removed. The formed sheet is then released from the molds 21 and 22 by applying positive pressure through hose 26 to the region between the sheet and the molds while the latter are held down. The formed sheet is then removed, and excess peripheral portions are trimmed, completing formation of the integral liner sections 13 and 14 as shown in FIG. 1.

Now making detailed reference to FIG. 3, the improved combination blower and heater apparatus 30 for supplying air to billow the softened sheet comprises an inner housing 31 within which is disposed an electrical resistance heater 33 of about 12 KW output. Housing 31 is generally box-shaped, electrical heater 33 being disposed in a left-hand portion and the blower 32 having its inlet communicating with a right-hand portion. A motor 36 is drivingly coupled to the blower 32. A makeup air inlet 35 is disposed atop a portion of housing 31 that contains heater 33, and is in air flow communication with the interior of the housing. A pivotal damper 37 is disposed in air inlet 35, and is selectively movable to predetermined positions to control the rate of introduction of makeup air introduced into housing 31.

A blower outlet passage 41 projects horizontally from the lower region of the blower scroll, and extends alongside the portion of the housing that contains heater 33. A lateral port 42 in outlet passage 41 communicates with the housing 31 upstream of the portion containing heater 33. A pivotal diverter valve 44 provided in passage 41 is selectively operable by a pneumatic-cylinder linkage 48 to open and close port 42. With reference also to FIG. 2, outlet passage 41 is connected to a flexible hose 43 disposed in fluid flow communication with connection 18 to chamber 20. The rate of air discharged from passage 41 through hose 43 is under the control of a pivotal damper 45 downstream of diverter valve 44. A gate valve 46 is selectively positionable, as by sliding, across outlet passage 41, in a region between diverter valve 44 and damper 45, to shut off completely the flow of air through hose 43. Positioning of valve conveniently is effected by a pneumatic cylinder linkage 50.

In operation, and prior to the billowing of sheet 16, blower motor 36 and heater 33 are energized. Inlet damper 37 is in an open position, diverter valve 44 is in its broken line position, and gate valve 46 is in closed position, such that makeup air entering inlet 35, along with air within housing 31, is discharged by the blower and caused to flow through lateral passage 42, over heater 33, and back into the blower. By virtue of this mode of operation, heated air is ready for supply to chamber 20 for the billowing phase of a molding operation, after initial sag of sheet 16 has taken place. At the required stage of the molding operation, billowing air is supplied to chamber 20 by opening gate valve 46, moving diverter valve 44 to its full line position partially closing lateral passage 42, so that one portion of the moving air is caused to recirculate through lateral passage 42, over heater 33, and into the blower, and another portion of the air is caused to flow through passage 41 and hose 43 into the chamber 20. During this operation, makeup air is introduced through intake 35.

Apparatus embodying the invention is further featured by inclusion of thermostatic control means, such as is seen at 49, operable to provide for cyclical energization of heater 33, to establish and maintain the temperature of air driven by blower means 32 within predetermined optimum limits, i.e. from about 200° to about 350°F, for billowing the sheet of thermoplastic material. As was mentioned hereinabove, one such thermoplastic material is ABS thermoplastic, in a sheet of about 0.290 inch thickness weighing about 40 pounds, and having dimensions of about 4 feet by 6 feet.

In further accordance with the invention, wherein it is desired to form a refrigerator liner from material as described above, it is preferred that blower 32 be capable of delivering about 2,900 CFM of air at a pressure of about 6 inches of water, for a typical combined volume of about 28 cubic feet for chamber 20 and the billowed sheet. With diverter valve 44 in its partially closed position for supplying billowing air, about 90% of the heated air discharged by the blower is recirculated over heater 33, and about 10% (i.e. about 290 CFM) of the remaining heated air is discharged into chamber 20 to billow the thermoplastic sheet. Since about one-half of this billowing air normally will be lost through leakage, a typical billowing phase will require about 10 to 18 seconds.

It will be appreciated that the invention provides improved billowing apparatus that enhances control of thermoplastic sheet thickness in a vacuum-forming operation.

I claim:

1. For use with apparatus for vacuum-forming a deep-drawn article from a heat-softened sheet of thermoplastic material, means for billowing such a sheet of material prior to the forming operation comprising: blower means having an inlet and an outlet and operable to supply air under positive pressure to billow said sheet of thermoplastic material; heater means disposed to heat said air moved by said blower means; and air diverter means selectively operable either to direct substantially full flow of air discharged by said blower means over said heater means and then to said inlet of said blower means, or to direct a first portion of the air discharged by said blower means to one side of said softened sheet to billow the same and the remaining portion of the air discharged by said blower means over said heater means and then to said inlet of said blower means.

2. Apparatus according to claim 1 and characterized by the inclusion of an air inlet for supplying makeup air to said blower means, said air inlet positioned to effect flow sequentially over said heater means and into said blower means and damper means for controlling the flow rate of air caused to flow through said air inlet.

3. Apparatus according to claim 1 and characterized in that said air diverter means includes a damper in the stream of air discharged by said blower means, said damper being movable to a first position for directing flow of air over the heater for return to the blower means, and movable to a second position both for controlling the flow rate of air delivered by said blower means to billow said sheet of plastic and for controlling the flow rate of air discharged by said blower and recirculated over said heater and into said blower.

4. Apparatus according to claim 3 and further characterized in that said damper is pivotally mounted for the recited movements.

5. Apparatus according to claim 1 and including thermostatic control means for establishing and maintaining the temperature of air driven by said blower means within predetermined optimum limits for the billowing of said sheets of thermoplastic material.

6. Apparatus according to claim 3 and characterized in that said air diverter means further includes a gate valve downstream of said damper and selectively operable either to shut off the flow of air to said one side of said softened sheet or to accommodate full flow of such air.

* * * * *